(12) United States Patent
Janabi

(10) Patent No.: US 12,090,012 B2
(45) Date of Patent: Sep. 17, 2024

(54) APPARATUS FOR SUCTION TUBE POSITIONING

(71) Applicant: Anmar Janabi, Naperville, IL (US)

(72) Inventor: Anmar Janabi, Naperville, IL (US)

( * ) Notice: Subject to any disclaimer, the term of this patent is extended or adjusted under 35 U.S.C. 154(b) by 0 days.

(21) Appl. No.: 18/362,553

(22) Filed: Jul. 31, 2023

(65) Prior Publication Data
US 2024/0024084 A1 Jan. 25, 2024

Related U.S. Application Data

(63) Continuation of application No. 18/301,912, filed on Apr. 17, 2023, now abandoned, which is a continuation of application No. 16/920,605, filed on Jul. 3, 2020, now abandoned.

(51) Int. Cl.
*A61C 17/10* (2006.01)
*A61C 17/08* (2006.01)

(52) U.S. Cl.
CPC ............... *A61C 17/10* (2019.05); *A61C 17/08* (2019.05)

(58) Field of Classification Search
CPC ......... A61C 17/10; A61C 17/08; A61C 17/06; A61C 17/092
See application file for complete search history.

(56) References Cited

U.S. PATENT DOCUMENTS 4,787,849 A * 11/1988 Jacoby ..................... A61C 5/82
433/139
8,221,316 B2 * 7/2012 DeGould ........... A61B 17/0206
600/237

FOREIGN PATENT DOCUMENTS

WO WO-2019174839 A1 * 9/2019 ............. A61C 17/08

* cited by examiner

*Primary Examiner* — Jacqueline T Johanas
*Assistant Examiner* — Drew S Folgmann
(74) *Attorney, Agent, or Firm* — Barry Choobin; Patent 360

(57) ABSTRACT

The present invention is directed to an apparatus and method for holding a medical device within reach of a dentist during a dental procedure, the dental device comprising a clamp portion configured to attach a medical device, the clamp portion having a proximal end and a distal end; and a hook portion coupled to the distal end of the clamp portion, the hook portion configured to engage with a supporting structure. In one implementation, the medical device is a suction hose, and the supporting structure is a dental dam.

9 Claims, 2 Drawing Sheets

APPARATUS FOR SUCTION TUBE POSITIONING

CROSS-REFERENCE TO RELATED APPLICATIONS

This application is a continuation of a U.S. patent application Ser. No. 18/301,912 filed on Apr. 17, 2023 which is the continuation of a U.S. patent application Ser. No. 16/920,605 filed on Jul. 3, 2020, which claims priority to the U.S. provisional patent application Ser. No. 62/829,175 filed Apr. 4, 2019, both of which are incorporated herein by reference in its entirety.

FIELD OF INVENTION

The present disclosure relates to an apparatus for use in dentistry, and particularly, relates to an apparatus for holding a suction hose within reach of a dentist during a dental procedure.

BACKGROUND

In a typical endodontic procedure, suctioning is almost always a necessary procedure for removing substances (such as water, saliva, caustic substances, etc.). A dental suction device that includes a suction hose is generally used for sucking the substances. In an endodontic procedure, suctioning may be needed frequently, however, the dentist cannot continuously keep holding the suction hose during the procedure. During intervals between the suctioning, the suction hose is usually handed over to an assistant, so the dentist can conduct the procedure. However, having a dental assistant just for holding the suction tube can increase the cost of a dental procedure.

Thus, a need is appreciated for an apparatus that can hook the suction hose within the reach of a dentist during a dental procedure.

SUMMARY OF THE INVENTION

The principal object of the present invention is therefore directed to an apparatus for holding a medical device within reach of a dentist during a dental procedure.

It is another object of the present invention that the apparatus can hold a suction hose close to the dentist during the dental procedure.

It is an additional object of the present invention that the apparatus is simple to use.

It is a further objective of the present invention that the apparatus is economical to manufacture.

In one implementation, provided is an apparatus for holding a medical device within reach of a dentist during a dental procedure. The medical device can be any device used frequently but not continuously during a dental procedure. In one case, the medical device can be a suction hose used for sucking saliva, fluids, and other substances from the oral cavity. The apparatus disclosed herein includes a clamp portion and a fastener portion coupled to the clamp portion. In one implementation, the clamp portion can be configured to hold the suction hose, while the fastener portion can couple with a supporting structure, wherein the supporting structure is within reach of a dentist during a dental procedure. In one case, the supporting structure can be a dental dam used in the dental procedure.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
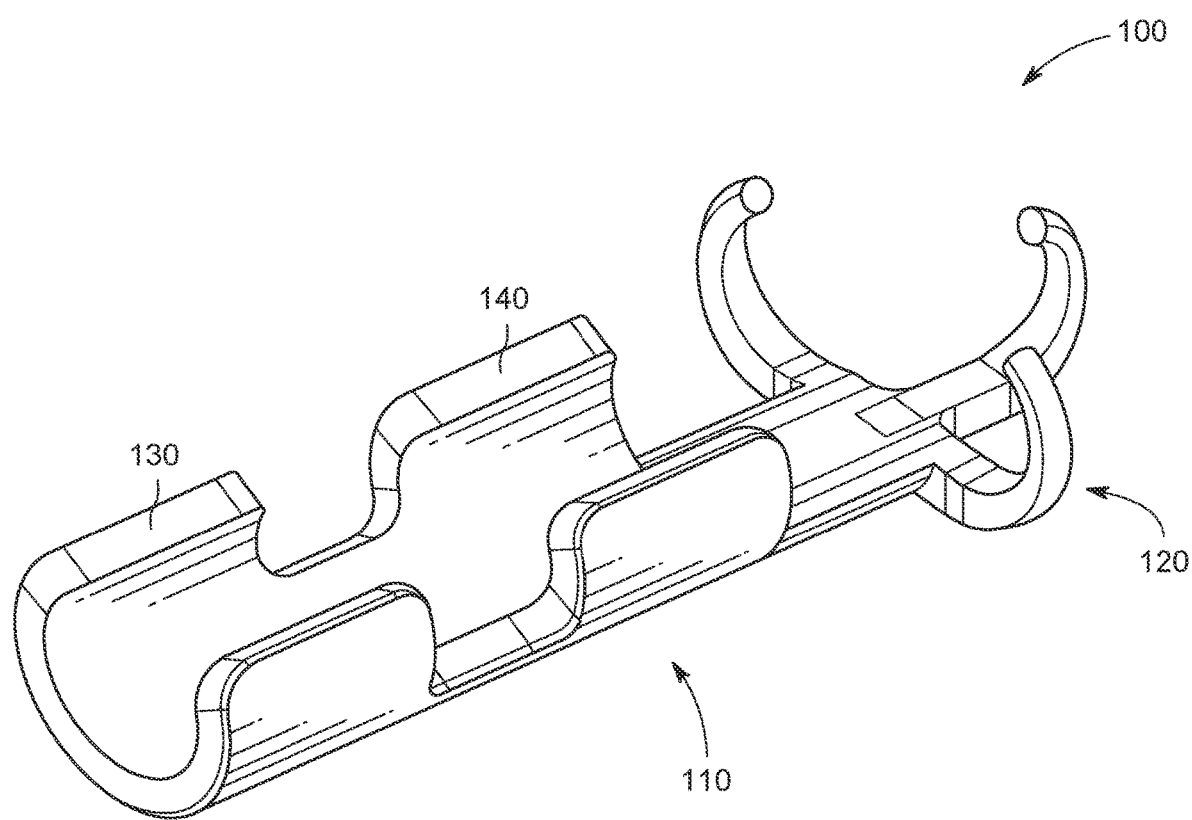
FIG. 1 illustrates an implementation of the apparatus for holding a medical device.

The subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatuses and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, the drawings may not be drawn to scale.

Referring to FIG. 1 which shows one implementation of the apparatus 100 for holding a medical device during endodontic procedures. In particular, the apparatus can be used to hold a suction hose during the endodontic procedures and any dental procedure that requires a dental dam. Preferably, the apparatus can hold the suction hose near a tooth or teeth that is being operated upon by a dentist. The apparatus 100 shown in FIG. 1 includes a clamp portion 110 and a hook portion 120. The clamp portion 110 can be configured to attach the suction hose. Particularly, the clamp portion 110 can attach an end of the suction hose. The clamp portion 110 is shown to have a pair of integrated curved arms 130 and 140, wherein the curvature of the pair of arms can be commensurate with the curvature of the suction hose, such that the clamp portion can grip the suction hose with an interference fit. The clamp portion has a proximal end and a distal end, wherein the pair of arms extend between the proximal end and the distal end. The hook portion can be coupled to the distal end, wherein an opening of the suction hose is adjacent to the hook portion when the suction hose is attached to the clamp portion.

The hook portion 120 shown in FIG. 1 has three hooks arranged in a tripod-like configuration. All the three hooks are oriented radially from the edge of the hook portion, wherein one hook points towards the clamp portion, while the other two hooks point towards each other and perpendicular to the first hook. The hooks are configured to hook to a supporting structure. It is preferable that the hook portion comprises the three hooks arranged as shown in FIG. 1. The three hooks as shown in FIG. 1, make the apparatus universal to fit any anterior or posterior teeth clamps; however, it is within the scope of the present invention, that the hook portion can have a distinct number of the hooks. In one case, the hook portion can have a single hook. In another case, the hook portion can have two hooks. The arrangement of hooks can also be varied, for example, a single hook can point towards the clamp portion. When the hook portion has two hooks, both the two hooks can be positioned side by side and radially oriented in the same direction i.e., towards the clamp portion. The number of hooks and their arrangement can provide distinct ways or orientations for hooking the apparatus to the supporting structure. Moreover, the hooks can also be substituted with a similar coupling mechanism, such as a loop fastener can also be provided at the end of the clamp portion, such that the loop can fasten to a pointed supporting structure. Alternatively, the hook portion can include attachment mechanisms including carabineer-like attachments, knobs, and prongs. Similarly, FIG. 1 shows that the clamp portion as a pair of arms that can attach to the suction hose through the interference fit. However, the clamp mechanism can also be provided with any other clamping mechanism that can attach the suction hose, for example, a hook and loop fastener can also be provided.

In one implementation, apparatus 100 can be manufactured of standard materials suitable for dental use, such as plastics, ceramics, metals, and the like. In one case, the apparatus 100 can be disposable. In another case, the apparatus can be reusable. When the apparatus is disposable, it can be manufactured of a disposable plastic material that is both economical and sturdy. When apparatus 100 is reusable, it can be manufactured from a material that can be sterilized. Sterilizable materials for use in making medical devices are known in the art and the present disclosure encompasses such material without departing from the scope of the disclosure. For example, certain plastics, metals, and ceramics are known to be used in dental medical devices that can be sterilized. Methods of sterilization are also known in the art, for example autoclaving. Furthermore, the apparatus can be manufactured by traditional manufacturing methods, such as injection molding, machining, casting, and the like. The apparatuses disclosed herein can also be manufactured by advanced additive manufacturing methods, such as 3D printing, laser sintering, and the like.

Figure 2:
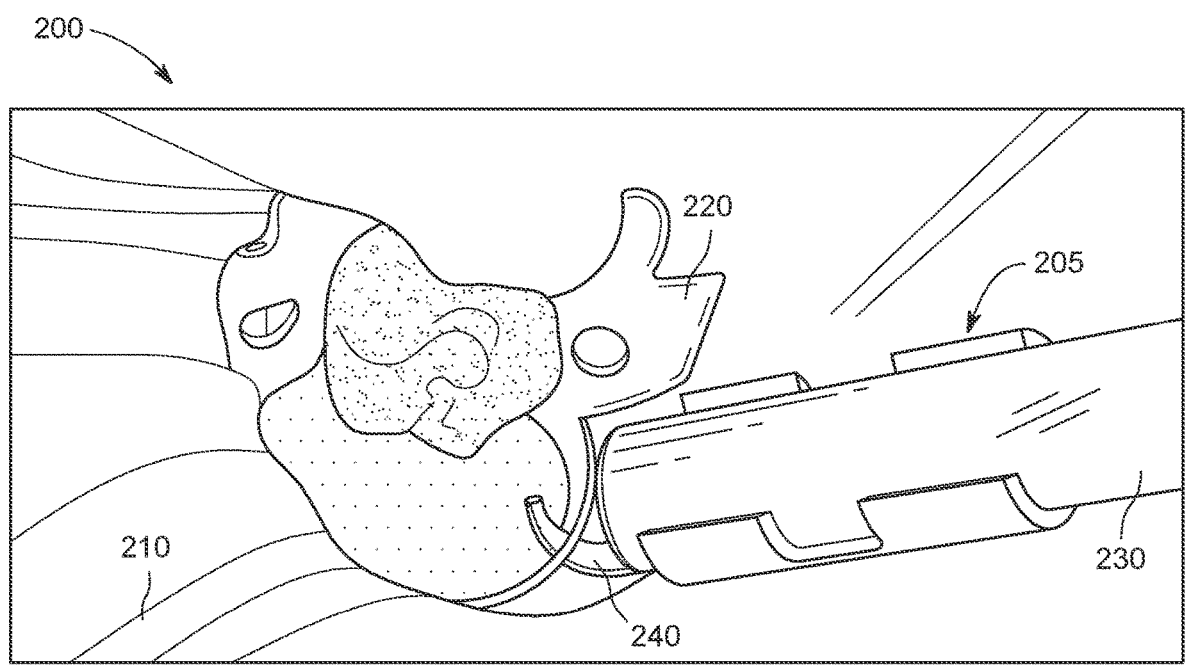
FIG. 2 shows the apparatus for FIG. 1 coupled to a dental dam.

Now referring to FIG. 2 which shows apparatus 205 coupled to a dental dam 200. Dental dams are commonly used during endodontic procedures for isolating teeth being operated from the rest of the oral cavity. The dental dam includes a rubber sheet 210 that can be anchored around the crown of the tooth using a metal clamp 220. The hook portion of the apparatus 205 can be hooked to the metal clamp 220 of the dental dam 200. FIG. 2 shows apparatus 205 attached to the suction hose 230. The opening of the suction hose 230 is adjacent to the hook 240. The apparatus 205 is shown to have two curved arms that attach to the suction hose 230 through an interference fit. The apparatus 205 is shown to have only one hook 240 which engages with the metal clamp 220.

In one implementation, the hooks are 9 mm long and 1.5 mm thick, and curve upside with 100 degrees with an internal diameter curvature of 5 mm. The function of the hooks in the disclosed apparatus is to be engaged to the rubber dam clamp arch. The purpose of the disclosed apparatus is to keep the suction hose attached close to the tooth without the need for an assistant or the clinician to keep holding it, thus freeing the clinician's or the assistant's hands to perform another task.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for holding a suction hose within reach of a dentist during a dental procedure, the method comprising:
    providing an apparatus, the apparatus comprising:
    an elongated body that has a proximal end and a distal end,
    one or more clamp portions configured in the elongated body, the one or more clamp portions are configured to snap-over the suction hose for clamping to the suction hose,
    a first arch shaped hook that extends from the distal end of the elongated body in a longitudinal direction,
    a second arch shaped hook, and a third arch shaped hook, wherein the first arch shaped hook, the second arch shaped hook, and the third arch shaped hook are arranged in a tripod configuration,
    each of the first arch shaped hook, the second arch shaped hook, and the third arch shaped hook are configured to hook to a dental dam,
    attaching the suction hose to at least one clamp portion of the one or more clamp portions; and
    engaging one of the first arch shaped hook, the second arch shaped hook, or the third arch shaped hook of the apparatus with the dental dam, wherein the dental dam is within reach of the dentist during the dental procedure.

2. The method of claim 1, wherein the one or more clamp portions, the elongated body, the first arch shaped hook, the second arch shaped hook, and the third arch shaped hook are integral forming a single unit.

3. The method of claim 1, wherein each of the one or more clamp portions has a pair of curved arms that snaps over the suction hose, a curvature of the pair of curved arms corresponds to a diameter of the suction hose for an interference fit.

4. A method for holding a medical device within reach of a dentist during a dental procedure, the method comprising:
   providing an apparatus, the apparatus comprising:
     an elongated body that has a proximal end and a distal end,
     one or more clamp portions configured in the elongated body, the one or more clamp portions are configured to snap-over the medical device for clamping to the medical device,
     a first arch shaped hook that extends from the distal end of the elongated body in a longitudinal direction,
     a second arch shaped hook, and
     a third arch shaped hook, wherein the first arch shaped hook, the second arch shaped hook, and the third arch shaped hook are arranged in a tripod configuration,
     each of the first arch shaped hook, the second arch shaped hook, and the third arch shaped hook are configured to hook to a dental dam,
   attaching the medical device to at least a one clamp portion of the one or more clamp portions; and engaging the arch shaped hook of the apparatus to the dental dam,
   wherein the dental dam is within reach of the dentist during the dental procedure.

5. The method of claim 4, wherein the one or more clamp portions, the elongated body, the first arch shaped hook, the second arch shaped hook, and the third arch shaped hook are integral forming a single unit.

6. The method of claim 4, wherein each of the one or more clamp portions has a pair of curved arms that snaps over the medical device, a curvature of the pair of curved arms corresponds to a diameter of the medical device for an interference fit.

7. A medical kit comprising:
   a dental dam; and
   an apparatus for holding a suction hose within reach of a dentist during a dental procedure, the apparatus comprising:
     an elongated body that has a proximal end and a distal end,
     one or more clamp portions configured in the elongated body, the one or more clamp portions are configured to snap-over the suction hose for clamping to the suction hose,
     a first arch shaped hook that extends from the distal end of the elongated body in a longitudinal direction,
     a second arch shaped hook,
     a third arch shaped hook, wherein the first arch shaped hook, the second arch shaped hook, and the third arch shaped hook are arranged in a tripod configuration, and
     each of the first arch shaped hook, the second arch shaped hook, and the third arch shaped hook are configured to hook to the dental dam.

8. The medical kit of claim 7, wherein the one or more clamp portions, the elongated body, the first arch shaped hook, the second arch shaped hook, and the third arch shaped hook are integral forming a single unit.

9. The medical kit of claim 7, wherein each of the one or more clamp portions has a pair of curved arms that snaps over the suction hose, a curvature of the pair of curved arms corresponds to a diameter of the suction hose for an interference fit.

* * * * *